Aug. 3, 1954     F. B. SEEBERGER     2,685,131
FROZEN FOOD CUTTER
Filed June 2, 1953
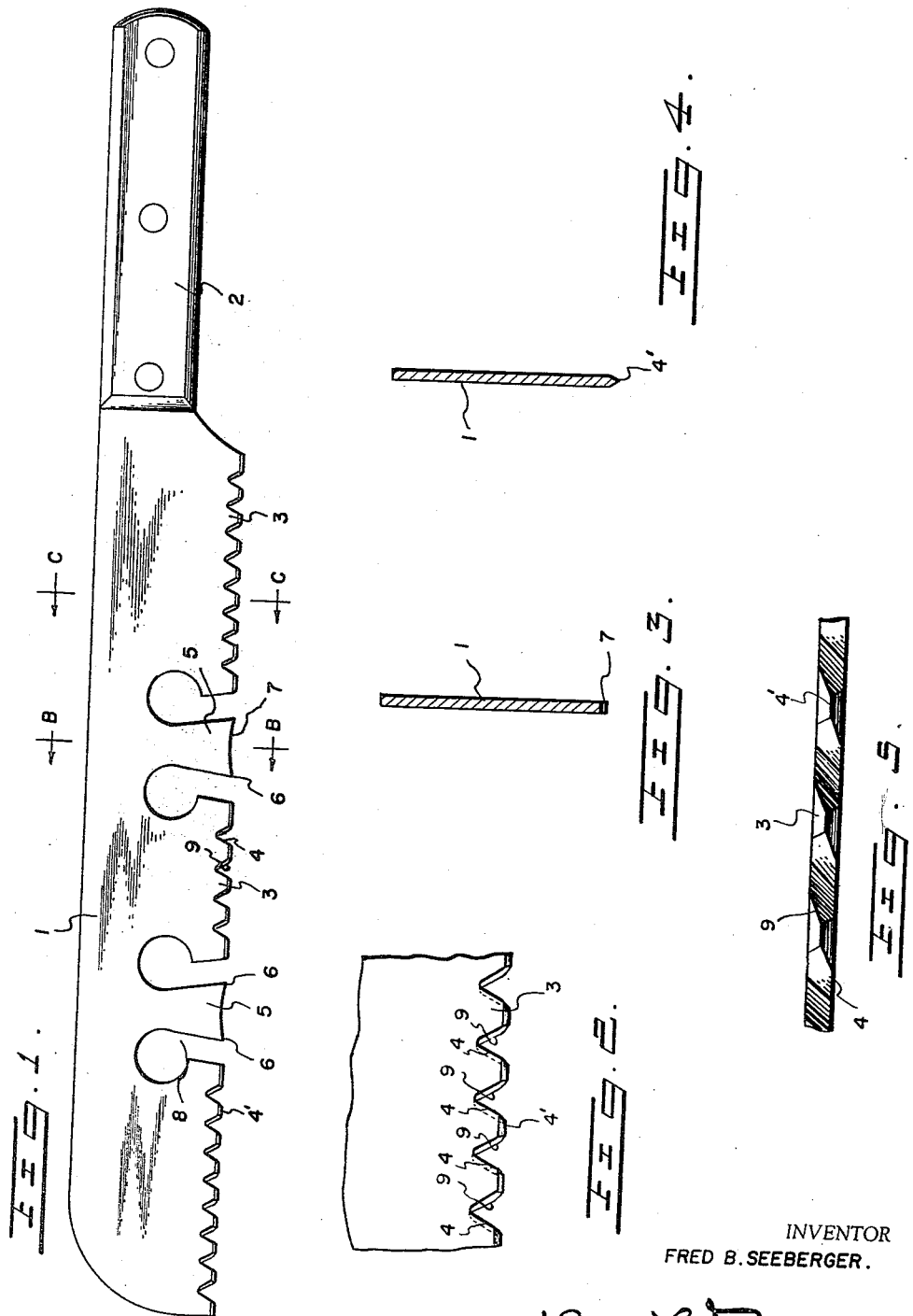
INVENTOR
FRED B. SEEBERGER.
BY
ATTORNEY Patented Aug. 3, 1954

2,685,131

UNITED STATES PATENT OFFICE 2,685,131

FROZEN FOOD CUTTER

Fred B. Seeberger, Yeadon, Pa., assignor of one-half to Harry H. Kennedy, Greenwich, Conn.

Application June 2, 1953, Serial No. 359,046

3 Claims. (Cl. 30—355)

This invention relates to cutters, specifically adapted for severing frozen vegetable and other food packages.

Many consumers do not find it economical or desirable to use an entire package of frozen food, particularly when a variety is desired or necessary. The general practice has been to thaw the package for division which is wasteful, as it cannot be frozen again and therefore must be used quickly to avoid spoilage.

The object of this invention is to provide a simple and efficient means for cleanly severing a package of frozen food into the desired portions without breaking the contents or removing the wrapping so that the remainder may be returned to the freezer in a frozen condition to be used when desired.

The improvement claimed is hereinafter fully set forth.

In the accompanying drawing, Figure 1 is a side elevation of the cutter.

Fig. 2 is an enlarged fragmentary view of the teeth 3.

Fig. 3 is a vertical section on line B—B in Figure 1.

Fig. 4 is a vertical section on line C—C in Figure 1, and

Fig. 5 is a bottom view of the slitting teeth shown in Fig. 2.

Reference numerals indicate the same parts in the several drawings.

In the practice of the invention as herein exemplified it will be noted that there is no departure from the conventional shape usually to be found in a long broad blade bread knife. It has been impossible, however, to sever into fractions a package of frozen vegetables or other foods with the generally used utensils such as serrated edge knives or ordinary knives. Saws in general are not satisfactory as they must be frequently removed to clear the teeth, and particles of paper and card board are intermingled with the food making it necessary to remove the foreign material before using the severed portion. This is due primarily to the fact that a frozen food is not a true solid. All food is mostly water and some crude fiber in cellular form. Frozen food, animal or vegetable, is substantially ice disposed in the cells to form a solid. The ice in block form is held in shape by the reinforcing action of the cellular and fibrous structure. It is this structure that clogs ordinary saw teeth and prevents further cutting until the saw blade is removed and the teeth cleaned. An ordinary knife or a serrated edge knife like a bread knife will not cut through frozen food or an ice cube or the like. It wedges.

In this disclosure the term cutter is used in a generic sense. In severing a frozen food package along the line of partition desired the blade of the cutter is usually reciprocated in edge contact with the package but no direct draw cut or sawing action as usually understood results. The action of the cutter is to first slot the package covering along one face, reduce the material engaged to a minute particle mass or pulp for a small fraction in depth at a time and then to entrap and disperse the minute loose particles of the mass or pulp to keep the line of severance clear and permit entire severance of the package by the continued reciprocation of the blade without removal.

In Figure 1 is shown a long broad blade 1, formed of some suitable material, usually steel, with a handle 2 at one end. Along the lower edge of the blade 1 are arranged a series of teeth 3 of generally triangular formation with the opposed sloping sides of the teeth being inverted V-shaped. The apex of each tooth is flattened and beveled from each side of the blade to form a sharp outer edge as shown at 4' for the purpose of slitting the engaged face or any engaged portion of the covering for the frozen food package.

The V-shaped sloping sides of the teeth 3 extend diagonally across the blade 1 to form alternate inclined chisel like edges 4, and similar edges 9, on the opposite sides of the blade. The spaced correspondingly inclined chisel edges 4 on one side of the blade and edges 9 on the opposite side of the blade have a shaving action to triturate or comminute the frozen material of the package during the severing operation to form minute particles in the form of a pulp on the line of contact. Thus the teeth in the pulp forming action have no real cutting or sawing effect on the frozen food but rather the pulp is created by trituration and temporarily held in the diagonal V-shaped portions.

Interposed along the teeth 3 are raker teeth 5 of a conventional form. Each tooth 5 terminates in cross edge faces 6, the undersurface therebetween being slightly relieved at 7. Between each edge face 6 and the adjacent tooth of the row of teeth 3 are formed apertures or gullets 8 extending up into the body of the blade 1 as clearly shown in Figure 1. These gullets 8 receive the pulp particles shaved from the frozen food by contact with the chisel edges 4 and 9 on opposite sides of blade 1 as the same is reciprocated back and forth or moved on the line of severance of the frozen food package as released from the inverted V sides of the teeth 3 where they are then dispersed back in the frozen food. The teeth 5 rake the line of contact of severance clean when the cutter is in operating contact therewith.

In operation the lower edge of the blade is engaged with a frozen food package along the line of severance. Reciprocation of the blade will slit the covering of any engaged face of the package and contact the food contents. The teeth 3 then function to reduce by trituration the material to a loose pulp for a small fraction in depth at a time. The minute shaved particles of the pulp formed from the frozen food in the line of contact are then raked by the teeth 5 into the gullets 8 and dispersed. Without removal of the blade, the package may be entirely severed on the line of partition desired. The teeth 3 outside of a slight slitting action have no ripping or sawing action but function due to their configuration and the type of material worked upon only to triturate, reduce or pulverize the frozen material by the spaced chisel edges 4 and 9 on opposite sides of the blade. No excessive pressure is necessary to operate this cutter and it may be easily operated by a housewife to cleanly sever the frozen food package at a minimum effort. The lower plane or edge 6 of raker teeth 5 is about .010" above the knife edge 4' of the teeth 3.

While two raker teeth 5 have been shown as a preferred embodiment of the invention to facilitate rapid severance of the food package, a single raker tooth 5 in the center of the blade will sever a package though not so rapidly.

The basic requirements for cutting a frozen food package without cleavage by force and relying entirely upon an edge contact of a movable tool such as a blade or the like is to slit the usual wrapping, form a loose mass or pulp by trituration along the line of severance at the point of blade contact, and then to entrap and disperse the mass or pulp along the line of severance in the tool as it progresses through the package. In the invention the slitting is accomplished by the beveled knife edges 4' of the outer points of the teeth 3, the trituration or pulverizing to form the loose particle mass or pulp by the angle of the sloping chisel edges 4 and 9 of each tooth 3 at opposite sides of the blade, and the entrapment and dispersion back into the frozen food of the mass or pulp by the raker teeth 5 and gullets 8. The sloping chisel edges 4 and 9 of the V sides of the teeth 3 at opposite sides of the blade form in effect a series of correspondingly inclined spaced chisels that shave off the ice and fibrous material of the frozen food package. By forming the teeth 3 by a series of diagonal parallel cuts across the edge of the body of the blade extending above the beveled slitting edge 4' there is formed in effect on each tooth a chisel edge reversely arranged on each side of the blade. The chisel edges 4 on one side of the blade function when the blade is reciprocated through the frozen food package against the same and the chisel edges 9 on the other side of the blade similarly function upon opposite reciprocation.

The edges 9 have no triturating function when the edges 4 function and similarly, the edges 4 have no triturating function when the edges 9 function. The teeth 3 being formed through the body of the blade allow room for the formation of pulp therein that is dropped and raked out of the line of contact by the raker teeth 5 and dispersed by the gullets 8.

What is claimed as the invention and desired to be secured by Letters Patent, is:

1. A frozen food package cutter comprising a blade, a plurality of substantially triangular teeth on the lower edge thereof, the apex of each tooth being flattened and beveled inwardly from each side of the blade to form a sharp lower slitting edge, a forwardly beveled chisel edge on one side edge of each tooth and a rearwardly beveled chisel edge on the other side of each tooth extending above the beveled sharp slitting edge to triturate the material of the package on the line of severance of the cutter during operation of the blade, and means spaced along the tooth edge of the blade to clear the triturated material at the line of severance.

2. A frozen food package cutter comprising a blade, a plurality of substantially triangular teeth on the lower edge thereof, the apex of each tooth being flattened and beveled inwardly from each side of the blade to form a sharp lower slitting edge, a forwardly beveled chisel edge on one side edge of each tooth and a rearwardly beveled chisel edge on the other side edge of each tooth extending above the beveled sharp slitting edge to triturate the material of the package on the line of severance of the cutter during operation of the blade, raker teeth between sets of the first mentioned teeth at spaced intervals, and gullets in the blade for cooperation with the raker teeth to clear the triturated material at the line of severance.

3. A frozen food package cutter comprising a blade, a plurality of substantially triangular teeth on the lower edge thereof, the apex of each tooth being flattened and beveled inwardly from each side of the blade to form a sharp lower slitting edge, a forwardly beveled chisel edge on one side edge of each tooth and a rearwardly beveled chisel edge on the other side edge of each tooth extending above the beveled sharp slitting edge to triturate the material of the package on the line of severance of the cutter during operation of the blade, raker teeth between sets of the first mentioned teeth at spaced intervals, gullets in the blade for cooperation with the raker teeth to clear the triturated material at the line of severance, and the lower edges of the raker teeth being spaced slightly above the sharp slitting edge.

References Cited in the file of this patent

UNITED STATES PATENTS

| Number | Name | Date |
|---|---|---|
| 2,059,414 | Taylor | Nov. 3, 1936 |
| 2,517,362 | Thompson | Aug. 1, 1950 |
| 2,517,840 | Chatlos | Aug. 8, 1950 |
| 2,552,652 | Stasiek | May 15, 1951 |